(12) United States Patent
Boualleg et al.

(10) Patent No.: US 10,131,547 B2
(45) Date of Patent: *Nov. 20, 2018

(54) AMORPHOUS MESOPOROUS ALUMINA WITH AN OPTIMIZED PORE DISTRIBUTION, AND PROCESS FOR ITS PREPARATION

(71) Applicant: IFP Energies Nouvelles, Rueil-Malmaison (FR)

(72) Inventors: Malika Boualleg, Villeurbanne (FR); Celine Bouvry, Rueil Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/318,047

(22) PCT Filed: Jun. 9, 2015

(86) PCT No.: PCT/EP2015/062825
§ 371 (c)(1),
(2) Date: Dec. 12, 2016

(87) PCT Pub. No.: WO2015/189199
PCT Pub. Date: Dec. 17, 2015

(65) Prior Publication Data
US 2017/0101324 A1 Apr. 13, 2017

(30) Foreign Application Priority Data

Jun. 13, 2014 (FR) ...................... 14 55412

(51) Int. Cl.
| | | |
|---|---|---|
| *C01F 7/00* | (2006.01) | |
| *C01F 7/34* | (2006.01) | |
| *B01J 21/04* | (2006.01) | |
| *C04B 35/111* | (2006.01) | |
| *C04B 35/64* | (2006.01) | |
| *C04B 38/00* | (2006.01) | |
| *B01J 20/08* | (2006.01) | |
| *B01J 35/10* | (2006.01) | |
| *B01J 37/00* | (2006.01) | |
| *B01J 37/02* | (2006.01) | |
| *B01J 37/03* | (2006.01) | |
| *B01J 37/08* | (2006.01) | |

(52) U.S. Cl.
CPC ............... *C01F 7/34* (2013.01); *B01J 20/08* (2013.01); *B01J 21/04* (2013.01); *B01J 35/1042* (2013.01); *B01J 35/1061* (2013.01); *B01J 37/009* (2013.01); *B01J 37/0236* (2013.01); *B01J 37/031* (2013.01); *B01J 37/08* (2013.01); *C04B 35/111* (2013.01); *C04B 35/64* (2013.01); *C04B 38/0045* (2013.01); *C01P 2006/14* (2013.01); *C01P 2006/16* (2013.01); *C04B 2235/3201* (2013.01); *C04B 2235/3222* (2013.01); *C04B 2235/443* (2013.01); *C04B 2235/444* (2013.01); *C04B 2235/6021* (2013.01); *C04B 2235/6586* (2013.01); *C04B 2235/6588* (2013.01)

(58) Field of Classification Search
CPC ....... C01F 7/34; C01F 7/30; C01F 7/02; B01J 20/28073; B01J 20/28076; B01J 20/28083; B01J 20/08; B01J 21/04; B01J 35/1042; B01J 35/1047
USPC .................. 502/439, 415; 423/628
See application file for complete search history.

(56) References Cited

U.S. PATENT DOCUMENTS

| | | | |
|---|---|---|---|
| 4,172,809 A | 10/1979 | Triki | |
| 6,114,587 A * | 9/2000 | Climent Olmedo | B01J 29/04 568/433 |
| 6,589,908 B1 | 7/2003 | Ginestra et al. | |
| 7,790,652 B2 | 9/2010 | Ackerman et al. | |
| 8,969,239 B2 | 3/2015 | Ginestra et al. | |
| 2005/0101480 A1 | 5/2005 | Ackerman et al. | |
| 2010/0276339 A1 | 11/2010 | Ginestra et al. | |
| 2013/0284667 A1* | 10/2013 | Pinnavaia | B01D 71/04 210/500.25 |
| 2014/0161716 A1 | 6/2014 | Suh et al. | |

FOREIGN PATENT DOCUMENTS

| | | | |
|---|---|---|---|
| JP | 2011092852 A * | 5/2011 | |
| JP | 2011177647 A * | 9/2011 | |
| WO | 2005/028106 A1 | 3/2005 | |

OTHER PUBLICATIONS

Abstract of JP-2011092852A, May 2011.*
Abstract of JP-2011177647A, Sep. 2011.*
International Search Report dated Aug. 31, 2015 issued in corresponding PCT/EP2015/062825 application (3 pages).

* cited by examiner

*Primary Examiner* — Steven J Bos
(74) *Attorney, Agent, or Firm* — Millen White Zelano and Branigan, PC; John Sopp

(57) ABSTRACT

An amorphous mesoporous alumina with a median mesopore diameter by volume of 16 nm or more, a mesopore volume of 0.5 mL/g or more, and a total pore volume of more than 0.75 mL/g. A process for preparing said alumina, comprising:
a) precipitating a basic precursor and an acidic precursor, at least one of which comprises aluminum, at a pH of 8.5 to 10.5, a temperature of 20° C. to 90° C. and for 2 minutes to 30 minutes, with a state of advance of 5% to 13%; b) heating the suspension; c) a second precipitating by adding another basic precursor and acidic precursor, at least one of which comprises aluminum, at a pH of 8.5 to 10.5, a temperature of 40° C. to 90° C. and for 2 to 50 minutes, with a state of advance of 87% to 95%; d) filtration; e) drying; f) shaping; g) heat treatment.

14 Claims, No Drawings

AMORPHOUS MESOPOROUS ALUMINA WITH AN OPTIMIZED PORE DISTRIBUTION, AND PROCESS FOR ITS PREPARATION

FIELD OF THE INVENTION

The present invention relates to the preparation of a shaped amorphous mesoporous alumina starting from an alumina gel with a low dispersibility, said alumina gel being obtained by a process comprising two steps for precipitating at least one aluminium precursor, with the production of a controlled quantity of alumina with respect to the total quantity of alumina formed at the end of the gel preparation process during the first gel precipitation step.

In particular, the present invention relates to an amorphous mesoporous alumina having a specific pore distribution. Because of its interesting properties, in particular in terms of pore distribution, the alumina of the invention may be used as a support for catalysts in all refining processes, and may also be used as an adsorbent.

PRIOR ART

The preparation of an alumina gel by precipitation in one precipitation step or in two precipitation steps is well known to the skilled person.

The U.S. Pat. No. 6,589,908 describes, for example, a process for the preparation of an alumina characterized by an absence of macropores, less than 5% of the total pore volume being constituted by pores with a diameter of more than 35 nm, a high pore volume of more than 0.8 mL/g, and a bimodal pore distribution in which the two modes are separated by 1 to 20 nm and the primary pore mode being larger than the median pore diameter.

In this regard, the mode described uses two steps for precipitation of alumina precursors under well-controlled temperature, pH and flow rate conditions. The first step is operated at a temperature in the range 25° C. to 60° C., and a pH in the range 3 to 10. The suspension is then heated to a temperature in the range 50° C. to 90° C. Reactants are again added to the suspension, which is then washed, dried, shaped and calcined in order to form a catalyst support.

No information is given regarding the dispersibility of the alumina gel, nor is any information provided as to the particular selection of the state of advance for the first step, which varies between 14% and 34% in the examples given.

Further, the U.S. Pat. No. 7,790,652 describes the preparation of an alumina support with a very specific pore distribution by precipitation; the support may be used as a catalyst support in a process for the hydroconversion of heavy hydrocarbon feeds.

The alumina support is prepared in accordance with a method comprising a first step for forming an alumina dispersion by mixing a first aqueous alkaline solution and a first aqueous acidic solution, in a controlled manner, at least one of said acidic and basic solutions, or both, comprising an aluminium compound. The acidic and basic solutions are mixed in proportions such that the pH of the resulting dispersion is in the range 8 to 11. The acidic and basic solutions are also mixed in quantities that can be used to produce a dispersion containing the desired quantity of alumina; in particular, the first step can be used to obtain 25% to 35% by weight of alumina with respect to the total quantity of alumina formed at the end of the two precipitation steps. The first step is operated at a temperature in the range 20° C. to 40° C. When the desired quantity of alumina has been formed, the temperature of the suspension is increased to a temperature in the range 45° C. to 70° C., then the heated suspension undergoes a second precipitation step by bringing said suspension into contact with a second aqueous alkaline solution and a second aqueous acidic solution, at least one of the two solutions, or both, comprising an aluminium compound. In addition, the pH is adjusted to between 8 and 10.5 by the proportions of acidic and basic solutions added and the remaining quantity of alumina to be formed in the second step is supplied by the quantities of the second solutions, acidic and basic, which are added. The second step is operated at a temperature in the range 20° C. to 40° C. The alumina gel which is thus formed comprises at least 95% boehmite. The dispersibility of the alumina gel obtained thereby is not mentioned. The alumina gel is then filtered, washed and optionally dried using methods which are known to the skilled person, in order to produce an alumina powder which is then shaped using methods known to the skilled person, then calcined in order to produce the final alumina support.

The first precipitation step of the preparation process of U.S. Pat. No. 7,790,652 is limited to an alumina production in the range 25% to 35% by weight; a higher production of alumina at the end of the first step does not allow for optimal filtration of the gel obtained. The material obtained is a support based on alumina with a high specific surface area, a total pore volume of 0.75 mL/g or more and a median pore diameter in the range 10 to 14 nm. Less than 5% of the pore volume is constituted by pores with a median mesopore diameter of more than 21 nm.

Surprisingly, the Applicant has discovered a novel process for preparing a shaped alumina starting from a specific alumina with a low dispersibility, and prepared in accordance with a process comprising two steps for precipitation of at least one aluminium precursor in which only a controlled and limited quantity, between 5% and 13% by weight of alumina with respect to the total quantity of alumina formed at the end of said gel preparation process, is formed in the first precipitation step. The Applicant has discovered that said gel can be shaped and calcined in order to obtain an amorphous mesoporous alumina with both a high pore volume, a high specific surface area, a specific monomodal mesopore distribution as well as a very high median mesopore diameter.

One aim of the present invention is to provide an amorphous mesoporous alumina with a specific monomodal mesopore distribution as well as a high mean pore diameter.

Another aim of the present invention is to provide a process for the preparation of said alumina by shaping an alumina gel with a low dispersibility, generally less than 15%, and in particular less than 10%, as well as with a crystallite size in the range 1 to 35 nm.

AIMS OF THE INVENTION

The aim of the present invention is to provide an amorphous mesoporous alumina with a high pore diameter as well as a particular pore distribution which is monomodal in the mesopore domain.

One advantage of the invention is that it provides an alumina the porosity of which is characterized by a very high contribution by pores between 10 and 30 nm, in particular with a median mesopore diameter of 16 nm or more, preferably 18 nm or more, highly preferably 20 nm or more, and still more preferably in the range 21 to 23 nm, limits included.

This porosity represents an important advantage for the diffusion of the molecules to be treated during catalytic reactions using these materials.

The present invention also provides a process for preparing said alumina, said process comprising at least the following steps:

a) a first step for precipitating, in an aqueous reaction medium, at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range 8.5 to 10.5 and the flow rate of the acidic and basic precursor or precursors containing aluminium being adjusted in order to obtain a state of advance for the first step in the range 5% to 13%, the state of advance being defined as being the proportion of alumina formed, in $Al_2O_3$ equivalents, during said first precipitation step with respect to the total quantity of alumina formed at the end of step c) of the preparation process, said step being operated at a temperature in the range 20° C. to 90° C. and for a period in the range 2 minutes to 30 minutes;

b) a step for heating the suspension to a temperature in the range 40° C. to 90° C. for a period in the range 7 minutes to 45 minutes;

c) a second step for precipitating the suspension obtained at the end of the heating step b) by adding to the suspension at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range 8.5 to 10.5 and the flow rate of the acidic and basic precursors containing aluminium being adjusted in order to obtain a state of advance for the second step in the range 87% to 95%, the state of advance being defined as the proportion of alumina formed, in $Al_2O_3$ equivalents, during said second precipitation step with respect to the total quantity of alumina formed at the end of step c) of the preparation process, said step being operated at a temperature in the range 40° C. to 90° C. and for a period in the range 2 minutes to 50 minutes;

d) a step for filtering the suspension obtained at the end of the second precipitation step c) in order to obtain an alumina gel;

e) a step for drying said alumina gel obtained in step d) in order to obtain a powder, said drying step preferably being operated by drying at a temperature in the range 20° C. to 200° C. and for a period in the range 8 h to 15 h or by spray drying or by any other method known to the skilled person;

f) a step for shaping the powder obtained at the end of step e) in order to obtain the green material;

g) a step for heat treating the green material obtained at the end of step e) at a temperature in the range 500° C. to 1000° C., in the presence or otherwise of a stream of air containing up to 60% by volume of water.

One advantage of the invention is the provision of a novel process for the preparation of an amorphous mesoporous alumina starting from a specific alumina gel prepared using a process comprising two steps for precipitation of at least one aluminium precursor in which only between 5% and 13% by weight of alumina is formed in the first precipitation step with respect to the total quantity of alumina formed at the end of said gel preparation process, said specific alumina gel having a dispersibility which is advantageously less than 15%, preferably in the range 6% to 13%, and highly preferably in the range 6% to 10%. The alumina preparation process of the invention can be used to obtain an amorphous mesoporous alumina with a specific pore distribution, in particular a high pore volume and a high median mesopore diameter, in particular 16 nm or more.

TERMINOLOGY

Throughout the remainder of the text, the dispersibility is defined as the weight of solid or peptised alumina gel which cannot be dispersed by centrifuging in a polypropylene tube at 3600 G for 3 min.

The alumina of the present invention also has a specific pore distribution, wherein the macropore and mesopore volumes are measured by mercury intrusion and the micropore volume is measured by nitrogen adsorption.

The term "macropores" means pores with an opening of more than 50 nm.

The term "mesopores" means pores with an opening in the range 2 nm to 50 nm, limits included.

The term "micropores" means pores with an opening of less than 2 nm.

In the following disclosure of the invention, the pore distribution measured by mercury porosimetry is determined by mercury intrusion porosimetry in accordance with the standard ASTM D 4284-83 at a maximum pressure of 4000 bar, using a surface tension of 484 dyne/cm and a contact angle of 140°. The wetting angle was taken to be equal to 140°, following the recommendations in the work "Techniques de l'ingénieur, traité analyse et caractérisation" [Engineering Techniques: analysis and characterization], P 1050-5, authors: Jean Charpin and Bernard Rasneur.

The median mesopore diameter ($D_p$, in nm) is also defined as being a diameter at which all of the pores with a size smaller than this diameter constitute 50% of the total mesopore volume, measured by mercury porosimetry.

The pore distribution measured by nitrogen adsorption is determined using the Barrett-Joyner-Halenda (BJH) model. The BJH-model nitrogen adsorption-desorption isotherm is described in the periodical "The Journal of American Society", 73, 373, (1951) by E. P. Barrett, L. G. Joyner and P. P. Halenda.

In the following disclosure of the invention, the term "specific surface area" means the BET specific surface area determined by nitrogen adsorption in accordance with the standard ASTM D 3663-78 based on the BRUNAUER-EMMETT-TELLER method described in the periodical "The Journal of American Society", 60, 309, (1938).

The volume of the macropores and mesopores is measured by mercury intrusion porosimetry in accordance with the standard ASTM D 4284-83 at a maximum pressure of 4000 bar, using a surface tension of 484 dyne/cm and a contact angle of 140°.

The value from which the mercury fills all of the intergranular voids is fixed at 0.2 MPa and it is assumed that beyond this, the mercury penetrates into the pores of the alumina.

In order to obtain better precision, the value of the total pore volume in mL/g given in the text below corresponds to the value for the total volume measured by mercury intrusion porosimetry in mL/g measured for the sample less the value of the mercury volume in mL/g measured for the same sample for a pressure corresponding to 30 psi (approximately 0.2 MPa).

The macropore volume of the alumina is thus defined as being the cumulative volume of mercury introduced at a pressure in the range 0.2 MPa to 30 MPa, corresponding to the volume contained in pores with an apparent diameter of more than 50 nm.

The mesopore volume of the alumina is thus defined as being the cumulative volume of mercury introduced at a pressure in the range 30 MPa to 400 MPa, corresponding to the volume contained in pores with an apparent diameter in the range 2 to 50 nm.

The volume of the micropores is measured by nitrogen porosimetry. The quantitative analysis of the microporosity is carried out using the "t" method (Lippens-De Boer method, 1965) which corresponds to a transform of the starting adsorption isotherm, as described in the work "Adsorption by powders and porous solids. Principles, methodology and applications" by F. Rouquérol, J. Rouquérol and K. Sing, Academic Press, 1999.

DESCRIPTION OF THE INVENTION

Summary of the Invention

The invention concerns a process for preparing an amorphous mesoporous alumina, said process comprising at least the following steps:
a) a first step for precipitating, in an aqueous reaction medium, at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range 8.5 to 10.5 and the flow rate of the acidic and basic precursor or precursors containing aluminium being adjusted in order to obtain a state of advance for the first step in the range 5% to 13%, the state of advance being defined as being the proportion of alumina formed, in $Al_2O_3$ equivalents, during said first precipitation step with respect to the total quantity of alumina formed at the end of step c), said step being operated at a temperature in the range 20 to 90 degrees and for a period in the range 2 minutes to 30 minutes;
b) a step for heating the suspension to a temperature in the range 40° C. to 90° C. for a period in the range 7 minutes to 45 minutes;
c) a second step for precipitating the suspension obtained at the end of the heating step b) by adding to the suspension at least one basic precursor selected from sodium aluminate, potassium aluminate, ammonia, sodium hydroxide and potassium hydroxide and at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range 8.5 to 10.5 and the flow rate of the acidic and basic precursors containing aluminium being adjusted in order to obtain a state of advance for the second step in the range 87% to 95%, the state of advance being defined as the proportion of alumina formed, in $Al_2O_3$ equivalents, during said second precipitation step with respect to the total quantity of alumina formed at the end of step c) of the preparation process, said step being operated at a temperature in the range 40° C. to 90° C. and for a period in the range 2 minutes to 50 minutes;
d) a step for filtering the suspension obtained at the end of the second precipitation step c) in order to obtain an alumina gel;
e) a step for drying said alumina gel obtained in step d) in order to obtain a powder;
f) a step for shaping the powder obtained at the end of step e) in order to obtain a green material;
g) a step for heat treating the green material obtained at the end of step f) at a temperature in the range 500° C. to 1000° C., in the presence or otherwise of a stream of air containing up to 60% by volume of water.

Preferably, the state of advance of the first precipitation step a) is in the range 6% to 12%.

Highly preferably, the state of advance of the first precipitation step a) is in the range 7% to 11%.

Preferably, the basic precursor is sodium aluminate.

Preferably, the acidic precursor is aluminium sulphate.

Preferably, in the first precipitation step, the aqueous reaction medium is water and said step is operated with stirring, in the absence of an organic additive.

The invention also concerns an amorphous mesoporous alumina with a median mesopore diameter, by volume determined by mercury intrusion porosimetry, of 16 nm or more, a mesopore volume, as measured by mercury intrusion porosimetry, of 0.5 mL/g or more, and a total pore volume, measured by mercury porosimetry, of more than 0.75 mL/g.

Preferably, the volume of the macropores is less than 10% of the total pore volume, highly preferably less than 5% of the total pore volume.

Preferably, the amorphous mesoporous alumina does not have any micropores.

Preferably, the amorphous mesoporous alumina has a median mesopore diameter, by volume determined by mercury intrusion porosimetry, of more than 18 nm, highly preferably more than 20 nm.

The invention also concerns an amorphous mesoporous alumina which is capable of being obtained by the preparation process in accordance with the invention.

DETAILED DESCRIPTION OF THE INVENTION

The alumina of the present invention is a mesoporous alumina with a controlled mesoporosity with good thermal and chemical stability, having a centred, uniform, monomodal and controlled mesopore size distribution.

The alumina advantageously has a specific surface area and a pore volume, in particular mesopore volume, which are calibrated.

Preferably, the mesoporous alumina is free from micropores.

Preferably, the alumina advantageously has a specific surface area of more than 75 m$^2$/g.

Highly preferably, the specific surface area of the mesoporous alumina is higher than 100 m$^2$/g.

Even more preferably, the specific surface area of the mesoporous alumina is more than 125 m$^2$/g.

The mesopore volume, defined as being the volume included in pores with an apparent diameter in the range 2 to 50 nm, limits included, is measured by mercury porosimetry. In accordance with the invention, the mesopore volume of the alumina is 0.5 mL/g or higher, highly preferably 0.7 mL/g or higher, and yet more preferably in the range 0.70 mL/g to 0.90 mL/g.

Preferably, the alumina of the invention is a non-mesostructured alumina.

In another aspect, the invention concerns the process for the preparation of said alumina.

In accordance with the invention, said preparation process comprises a first step a) for precipitation, a step b) for heating, a second precipitation step c), a step d) for filtration, a step e) for drying, a step f) for shaping, and a step g) for heat treatment.

The state of advance for each of the precipitation steps is defined as being the proportion of alumina formed, in $Al_2O_3$ equivalents, during said first or second precipitation with respect to the total quantity of alumina formed, in $Al_2O_3$ equivalents, at the end of the two precipitation steps and more generally at the end of the alumina gel preparation steps and especially at the end of step c) of the preparation process of the invention.

Step a): First Precipitation

This step consists of bringing at least one basic precursor selected from sodium aluminate, potassium aluminate, ammonia, sodium hydroxide and potassium hydroxide into contact in an aqueous reaction medium with at least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range 8.5 to 10.5 and the flow rate of the acidic and basic precursor or precursors containing aluminium being adjusted in order to obtain a state of advance for the first step in the range 5% to 13%, the state of advance being defined as being the proportion of alumina formed, in $Al_2O_3$ equivalents, during said first precipitation step with respect to the total quantity of alumina formed at the end of the precipitation steps and more generally at the end of the alumina gel preparation steps, especially at the end of step c) of the preparation process, said step being operated at a temperature in the range 20° C. to 90° C. and for a period in the range 2 minutes to 30 minutes.

Mixing at least one basic precursor and at least one acidic precursor in an aqueous reaction medium; this means that at least one of the acidic or basic precursors must comprise aluminium. It is also possible for at least two of the basic and acidic precursors to comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, the aqueous reaction medium is water.

Preferably, said step a) is operated with stirring.

Preferably, said step a) is carried out in the absence of an organic additive.

The acidic and basic precursors, whether or not they contain aluminium, are mixed, preferably in solution, in the aqueous reaction medium in proportions such that the pH of the resulting suspension is in the range 8.5 to 10.5.

In accordance with the invention, the acidic precursors of alumina and the basic precursors of alumina may be used alone or as a mixture in the precipitation step.

In accordance with the invention, the relative flow rate of the acidic and basic precursors, whether or not they contain aluminium, is selected so as to obtain a pH in the reaction medium in the range 8.5 to 10.5.

In the preferred case in which the basic and acidic precursors are respectively sodium aluminate and aluminium sulphate, the ratio by weight of said basic precursor to said acidic precursor is advantageously in the range 1.60 to 2.05.

For the other basic and acidic precursors, whether or not they contain aluminium, the base/acid weight ratios are established by a graph of the neutralization of the base by the acid. The skilled person can readily obtain a graph of this type.

Preferably, said precipitation step a) is carried out at a pH in the range 8.5 to 10.0 and highly preferably in the range 8.7 to 9.9.

Preferably, the first precipitation step a) is carried out at a temperature in the range 20° C. to 90° C., preferably in the range 20° C. to 70° C. and more preferably in the range 30° C. to 50° C.

Preferably, the first precipitation step a) is carried out at a pH in the range 8 to 10.5, preferably in the range 8 to 10.5, more preferably in the range 8.5 to 10 and highly preferably in the range 8.7 to 9.9.

Preferably, the first precipitation step a) is carried out for a period in the range 5 to 20 minutes, preferably 5 to 15 minutes.

In accordance with the invention, the state of advance for said first precipitation step a) is in the range 5% to 13%, preferably in the range 6% to 12% and preferably in the range 7% to 11%. The state of advance is defined as being the proportion of alumina, in $Al_2O_3$ equivalents, formed during said first precipitation step with respect to the total quantity of alumina formed at the end of step c) of the preparation process.

The acidic and basic precursors containing aluminium are thus also introduced in quantities that mean that a suspension containing the desired quantity of alumina can be obtained, as a function of the final concentration of alumina to be obtained. In particular, said step a) can be used to obtain 5% to 13% by weight of alumina with respect to the total quantity of alumina formed at the end of step c) of the preparation process.

Step b): Heating

In accordance with the invention, said preparation process comprises a step b) for heating the suspension obtained at the end of the first precipitation step a).

In accordance with the invention, before the second precipitation step is carried out, a step for heating the suspension obtained at the end of the precipitation step a) is carried out between the two precipitation steps.

Said step for heating the suspension obtained at the end of step a), carried out between said first precipitation step a) and the second precipitation step c), is operated at a temperature in the range 40° C. to 90° C., preferably in the range 40° C. to 80° C., preferably in the range 40° C. to 70° C. and highly preferably in the range 40° C. to 65° C.

Said heating step is carried out for a period in the range 7 to 45 minutes, preferably in the range 7 to 35 minutes.

Said heating step is advantageously carried out using any of the heating methods known to the skilled person.

Step c): Second Precipitation

In accordance with the invention, said preparation process comprises a second step for precipitation of the heated suspension obtained at the end of heating step b), said second step being operated by adding to said suspension at least one basic precursor selected from sodium aluminate, potassium aluminate, ammonia, sodium hydroxide and potassium hydroxide and least one acidic precursor selected from aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH for the reaction medium in the range 8.5 to 10.5 and the flow rate of the acidic and basic precursors containing aluminium being adjusted so as to obtain a state of advance for the second step in the range 87% to 95%, the state of advance being defined as being the proportion of alumina formed, in $Al_2O_3$ equivalents, during said second precipitation step with respect to the total quantity of alumina formed at the end of step c) of the preparation process, said step being operated at a temperature in the range 40° C. to 90° C., and for a period in the range 2 minutes to 50 minutes.

The basic and acidic precursor or precursors are added in said second step for co-precipitation in aqueous solution.

In similar manner to the first precipitation step a), adding at least one basic precursor and at least one acidic precursor to the heated suspension necessitates that at least one of the basic or acidic precursors comprises aluminium. It is also possible for at least two of the basic and acidic precursors to comprise aluminium.

The basic precursors comprising aluminium are sodium aluminate and potassium aluminate. The preferred basic precursor is sodium aluminate.

The acidic precursors comprising aluminium are aluminium sulphate, aluminium chloride and aluminium nitrate. The preferred acidic precursor is aluminium sulphate.

Preferably, said second precipitation step is operated with stirring.

Preferably, said second step is carried out in the absence of an organic additive.

The acidic and basic precursors, whether or not they contain aluminium, are mixed, preferably in solution, into the suspension in proportions such that the pH of the resulting suspension is in the range 8.5 to 10.5.

In similar manner to precipitation step a), the relative flow rate of the acidic and basic precursors, whether or not they contain aluminium, is selected so as to obtain a pH of the reaction medium in the range 8.5 to 10.5, preferably in the range 8.5 to 10, still more preferably in the range 8.7 to 9.9.

In the preferred case in which the basic and acidic precursors are respectively sodium aluminate and aluminium sulphate, the ratio by weight of said basic precursor to said acidic precursor is advantageously in the range 1.60 to 2.05.

For the other basic and acidic precursors, whether or not they contain aluminium, the base/acid weight ratios are established by means of a graph of the neutralization of the base by the acid. The skilled person can readily obtain a graph of this type.

Preferably, said second precipitation step is carried out at a pH in the range 8.5 to 10.0, preferably in the range 8.7 to 9.9.

The aluminium precursors are also mixed in quantities that can be used to produce a suspension containing the desired quantity of alumina, as a function of the final concentration of alumina to be obtained. In particular, said second precipitation step can be used to obtain 87% to 95% by weight of alumina with respect to the total quantity of alumina formed at the end of the two precipitation steps.

In similar manner to that of precipitation step a), it is the flow rate of the acidic and basic precursors containing aluminium which is adjusted in order to obtain a state of advance for the second step in the range 87% to 95%, preferably in the range 88% to 94%, highly preferably in the range 89% to 93%, the state of advance being defined as the proportion of alumina formed, in $Al_2O_3$ equivalents, during said second precipitation step with respect to the total quantity of alumina formed at the end of step c) of the preparation process.

Thus, depending on the envisaged alumina concentration at the end of the precipitation steps, preferably in the range 20 to 100 g/L, the quantities of aluminium which have to be supplied by the acidic and/or basic precursors are calculated and the flow rate of the precursors is adjusted as a function of the concentration of said added aluminium-containing precursors, of the quantity of water added to the reaction medium and of the state of advance required for each of the precipitation steps.

In similar manner to that of precipitation step a), the flow rates of the acid and/or basic precursors containing aluminium depend on the dimensions of the reactor used and thus on the quantity of water added to the reaction medium.

By way of example, if a 3 L reactor is used and 1 L of alumina suspension with a final $Al_2O_3$ concentration of 50 g/L is envisaged, with a target state of advance of 10% for the first precipitation step, 10% of the total alumina has to be supplied during precipitation step a). The alumina precursors are sodium aluminate at a concentration of 155 g/L as $Al_2O_3$ and aluminium sulphate at a concentration of 102 g/L as $Al_2O_3$. The precipitation pH for the first step is fixed at 9.5 and the second at 9. The quantity of water added to the reactor is 620 mL.

For the first precipitation step a) operating at 30° C. and for 8 minutes, the flow rate of aluminium sulphate has to be 2.1 mL/min and the sodium aluminate flow rate is 2.6 mL/min. The weight ratio of sodium aluminate to aluminium sulphate is thus 1.91.

For the second precipitation step, operating at 70° C. for 30 minutes, the flow rate of the aluminium sulphate must be 5.2 mL/min and the sodium aluminate flow rate is 6.3 mL/min. The weight ratio of sodium aluminate to aluminium sulphate is thus 1.84.

Preferably, the second precipitation step is carried out at a temperature in the range 40° C. to 80° C., preferably in the range 45° C. to 70° C. and highly preferably in the range 50° C. to 70° C.

Preferably, the second precipitation step is carried out for a period in the range 5 to 45 minutes, preferably 7 to 40 minutes.

The second precipitation step can generally be used to obtain a suspension of alumina with a concentration of $Al_2O_3$ in the range 20 to 100 g/L, preferably in the range 20 to 80 g/L and more preferably in the range 20 to 50 g/L.

Step d): Filtration

The process for preparing alumina in accordance with the invention also comprises a step for filtration of the suspension obtained at the end of the second precipitation step c). Said filtration step is carried out using methods known to the skilled person.

The filtration capability of the suspension obtained at the end of the two precipitation steps is improved by the low dispersibility of the alumina gel obtained, which means that the productivity of the process of the invention can be improved, and also that it can be sized up to an industrial scale process.

Said filtration step is advantageously followed by at least one washing step, preferably with water and preferably by one to three washing steps, with a quantity of water equal to the quantity of filtered precipitate.

The concatenation of the steps of first precipitation a), heating b) and second precipitation c) and filtration step d) can be used to obtain a specific alumina gel with a dispersibility ratio of less than 15%, preferably in the range 5% to 15% and more preferably in the range 6% to 14%, and highly preferably in the range 7% to 13%, and even more preferably in the range 7% to 10%, and a crystallite size in the range 1 to 35 nm, preferably in the range 2 to 35 nm.

The alumina gel obtained also advantageously has a sulphur content, measured by X ray fluorescence, in the range 0.001% to 2% by weight, preferably in the range 0.01% to 0.2% by weight, and a sodium content, measured by ICP-MS or inductively coupled plasma mass spectrometry, in the range 0.001% to 2% by weight, preferably in the range 0.01% to 0.1% by weight, the percentages by weight being expressed with respect to the total mass of the alumina gel.

In particular, the alumina gel or boehmite in the powder form in accordance with the invention is composed of crystallites the size of which, obtained by applying Scherrer's formula using X ray diffraction with the crystallographic directions [020] and [120], are respectively in the range 2 to 20 nm and in the range 2 to 35 nm.

Preferably, the alumina gel of the invention has a crystallite size with the crystallographic direction [020] in the range 1 to 15 nm and a crystallite size with the crystallographic direction [120] in the range 1 to 35 nm.

X ray diffraction on the alumina gels or boehmites was carried out using the conventional powder method employing a diffractometer.

Scherrer's formula is a formula used in X ray diffraction on powders or polycrystalline samples which links the half height diffraction peak width to the crystallite size. It is described in detail in the reference: Appl. Cryst. (1978). 11, 102-113 Scherrer after sixty years: A survey and some new results in the determination of crystallite size, J. I. Langford and A. J. C. Wilson.

The low dispersibility of the gel which is thus prepared can be used to facilitate the step for shaping said gel using any of the methods known to the skilled person, in particular by mixing-extrusion, granulation and by the oil-drop technique.

Step e): Drying

In accordance with the invention, the alumina gel obtained at the end of the second precipitation step c) followed by a filtration step d) is dried in a drying step e) in order to obtain a powder, said drying step being carried out, for example, by drying at a temperature in the range 20° C. to 200° C. and for a period in the range 8 h to 15 h or by spray drying or by any other drying technique known to the skilled person.

In the case in which said drying step e) is carried out by spray drying, the cake obtained at the end of the second precipitation step, followed by a filtration step, is taken up into suspension. Said suspension is then atomized into fine droplets, in a vertical cylindrical chamber in contact with a stream of hot air in order to evaporate the water in accordance with a principle which is well known to the skilled person. The powder obtained is entrained by the flow of heat into a cyclone or a sleeve filter which will separate the air from the powder.

Preferably, in the case in which said drying step e) is carried out by spray drying, the spray drying is carried out in accordance with the operating protocol described in the publication by Asep Bayu Dani Nandiyanto, Kikuo Okuyama, Advanced Powder Technology, 22, 1-19, 2011.

Step f): Shaping

In accordance with the invention, the powder obtained at the end of drying step e) is shaped in a step f) in order to obtain a green material.

The term "green material" means the shaped material which has not undergone heat treatment steps.

Preferably, said shaping step f) is carried out by mixing-extrusion, by granulation, by the oil drop technique, by pelletization.

Highly preferably, said shaping step f) is carried out by mixing-extrusion.

Step g): Heat Treatment

In accordance with the invention, the green material obtained at the end of shaping step f) then undergoes a step g) for heat treatment at a temperature in the range 500° C. to 1000° C., for a period in the range 2 to 10 h, in the presence or otherwise of a stream of air containing up to 60% by volume of water.

Preferably, said heat treatment step g) is operated at a temperature in the range 540° C. to 900° C.

Preferably, said heat treatment step g) is operated for a period in the range 2 h to 10 h.

Said heat treatment step g) can be used to transform boehmite into the final alumina.

The heat treatment step may be preceded by a drying step at a temperature in the range 50° C. to 120° C., using any technique which is familiar to the skilled person.

Characteristics of Amorphous Mesoporous Alumina Obtained

The preparation process of the invention can be used to obtain an amorphous mesoporous alumina with a high median mesopore diameter, determined from the graph of the pore distribution, by volume by mercury intrusion porosimetry, which is advantageously 16 nm or more, preferably 18 nm or more, highly preferably 20 nm or more, still more preferably in the range 21 to 23 nm, limits included.

The mesoporous alumina prepared in accordance with the process of the invention is advantageously free of micropores. The absence of micropores is verified by nitrogen porosimetry.

The mesoporous alumina of the invention advantageously has a mesopore volume, i.e. contained in pores with a diameter in the range 2 to 50 nm, limits included, as measured by mercury intrusion porosimetry, of 0.5 mL/g or more, preferably 0.7 mL/g or more.

The total pore volume measured by mercury porosimetry is advantageously more than 0.75 mL/g.

The mesoporous alumina of the invention generally comprises a proportion of macropores, defined as pores with a diameter of more than 50 nm, which is less than 10%, preferably less than 5% of the total pore volume determined by mercury porosimetry.

The mesoporous alumina of the invention generally has a specific surface area of more than 100 $m^2/g$.

The invention will now be illustrated in the following examples which are not in any way limiting in nature.

EXAMPLES

Example 1 (in Accordance with the Invention)

Three aluminas in accordance with the invention were produced in conventional equipment with a 5 L reactor, in 3 steps.

The concentration of precursors was as follows: aluminium sulphate $Al_2(SO_4)_3$ at 102 g/L in $Al_2O_3$ and sodium aluminate, NaAlOO, at 155 g/L in $Al_2O_3$.

The alumina in accordance with the invention (A) was produced using the following steps:

a) A first co-precipitation of aluminium sulphate $Al_2(SO_4)_3$ and sodium aluminate NaAlOO at 30° C. and pH=9.1 over 8 min: the state of advance was 8%. The state of advance corresponds to the proportion of alumina formed during the first step, i.e. a final concentration of alumina of 45 g/L. If a 5 L reactor is used and 4 L of a suspension of alumina with a final concentration of $Al_2O_3$ of 45 g/L is envisaged, with a target state of advance of 8% for the first precipitation step, 8% of the total alumina has to be supplied during precipitation step a). The pH for the precipitation of the first step was fixed at 9.1 and The pH for the precipitation of the second step was 9.1. The quantity of water initially present in the reactor was 1330 mL.

For the first precipitation step a) operating at 30° C. and for 8 minutes, the aluminium sulphate flow rate had to be 6.1 mL/min, the sodium aluminate flow rate was 7.6 mL/min and the water flow rate was 69.7 mL/min. The sodium aluminate to aluminium sulphate weight ratio was thus 1.91.

b) A rise in temperature from 30° C. to 70° C. over 20 to 30 min;

c) A second co-precipitation of aluminium sulphate $Al_2(SO_4)_3$ and sodium aluminate NaAlOO at 70° C. and pH=9.1 over 30 min, with a state of advance of 92%; for the second precipitation step, operated at 70° C. over 30 minutes, the aluminium sulphate flow rate had to be 19 mL/min, the sodium aluminate flow rate was 23 mL/min and the water flow rate was 24.7 mL/min. The weight ratio of sodium aluminate to aluminium sulphate was thus 1.84.

d) Filtration by displacement over a P4 Buchner type frit apparatus and washing 3 times with 5 L of distilled water at 70° C.

e) Drying overnight at 120° C.

f) Shaping the green material.

The dried alumina gel was introduced into a Brabender type mixer. Water acidified with nitric acid to a total concentration of acid of 3%, expressed by weight with respect to the mass of dry gel introduced into the mixer, was added over 10 minutes, while mixing at 20 rpm. The acid mixing was continued for 5 minutes. A neutralization step was then carried out by adding an ammoniacal solution to the mixer, with a percentage neutralization of 200%, expressed by weight of ammonia with respect to the quantity of nitric acid introduced into the mixer for the acidification step. Mixing was continued for 3 minutes.

The paste obtained was then extruded through a 2 mm three-lobed die.

g) Heat treatment: the extrudates obtained were dried at 100° C. overnight, then calcined for 2 h at 800° C. in a stream of moist air in a tube furnace (HSV=1 L/h/g with 30% v/v water).

The pore distribution of the alumina obtained was characterized by mercury intrusion porosimetry using the standard ASTM D 4284-83 at a maximum pressure of 4000 bar using a surface tension of 484 dyne/cm and a contact angle of 140°.

The absence of microporosity was verified by nitrogen porosimetry.

A second alumina in accordance with the invention (B) and a third alumina in accordance with the invention (C) were produced using the following steps (only heat treatment step g) was different):

a) A first co-precipitation of aluminium sulphate $Al_2(SO_4)_3$ and sodium aluminate NaAlOO at 30° C. and pH=9.1 over 8 min: the state of advance was 10%. The state of advance corresponds to the proportion of alumina formed during the first step, i.e. a final concentration of alumina of 45 g/L. If a 5 L reactor is used and 4 L of a suspension of alumina with a final concentration of $Al_2O_3$ of 45 g/L is envisaged, with a target state of advance of 10% for the first precipitation step, 10% of the total alumina has to be supplied during precipitation step a). The pH for the precipitation of the first step was fixed at 9.1 and the pH of the precipitation in the second step was 9.1. The quantity of water initially present in the reactor was 1330 mL.

For the first precipitation step a) operating at 30° C. and for 8 minutes, the aluminium sulphate flow rate had to be 7.6 mL/min, the sodium aluminate flow rate was 9.1 mL/min and the water flow rate was 24.6 mL/min. The sodium aluminate to aluminium sulphate weight ratio was thus 1.91.

b) A rise in temperature from 30° C. to 70° C. over 20 to 30 min;

c) A second co-precipitation of aluminium sulphate $Al_2(SO_4)_3$ and sodium aluminate NaAlOO at 70° C. and pH=9.1 over 30 min, with a state of advance of 90%; for the second precipitation step, operated at 70° C. over 30 minutes, the aluminium sulphate flow rate had to be 18.5 mL/min, the sodium aluminate flow rate was 29 mL/min and the water flow rate was 33.8 mL/min. The weight ratio of sodium aluminate to aluminium sulphate was thus 1.84.

d) Filtration by displacement over a P4 Buchner type frit apparatus and washing 3 times with 5 L of distilled water at 70° C.

e) Drying overnight at 120° C.

f) Shaping the green material.

The dried alumina gel was introduced into a Brabender type mixer. Water acidified with nitric acid to a total concentration of acid of 3%, expressed by weight with respect to the mass of dry gel introduced into the mixer, was added over 10 minutes, while mixing at 20 rpm. The acid mixing was continued for 5 minutes. A neutralization step was then carried out by adding an ammoniacal solution to the mixer, with a percentage neutralization of 200%, expressed as the weight of ammonia with respect to the quantity of nitric acid introduced into the mixer for the acidification step. Mixing was continued for 3 minutes.

The paste obtained was then extruded through a 2 mm three-lobed die.

g) Heat treatment: the extrudates obtained were dried at 100° C. overnight, then calcined for 2 h at 800° C. in a stream of moist air in a tube furnace (HSV=1 L/h/g, no water for alumina B, with 30% v/v water for alumina C).

TABLE 1

Textural characteristics of aluminas obtained

| | | A | B | C |
|---|---|---|---|---|
| State of advance of first precipitation step | | 8% | 10% | 10% |
| Heat treatment of extrudates | | 800° C., 30% water v/v | 800° C., no water | 800° C., 30% water v/v |
| Mesoporosity | $V_{meso}$ (mL/g) | 0.85 | 0.77 | 0.78 |
| | $D_p$ (nm) | 21.3 | 16 | 22.5 |
| Microporosity | $S_{microporous}$ (m$^2$/g) | 0 | 0 | 0 |

TABLE 1-continued

Textural characteristics of aluminas obtained

| | | A | B | C |
|---|---|---|---|---|
| Macroporosity | $V_{macro}$ (mL/g) | 0.03 | 0.01 | 0.01 |
| BET surface area | (m²/g) | 145 | 183 | 140 |
| Pore distribution | Vd < 10 nm (mL/g) | 0.01 | 0.01 | 0.01 |
| | V d 10-20 nm (mL/g) | 0.38 | 0.50 | 0.34 |
| | V d 20-50 nm (mL/g) | 0.42 | 0.30 | 0.46 |
| | V d 50-7000 nm (mL/g) | 0.03 | 0.01 | 0.01 |
| | V d > 7000 nm (mL/g) | 0.06 | 0.05 | 0.05 |

Selecting the state of advance to be in the range 5% to 13%, preferably in the range 7% to 11% for the first precipitation step means that an alumina can be obtained which has a high mesopore volume (more than 0.75 mL/g), a high specific surface area (BET surface area of more than 75 m²/g), an absence of micropores: pores with a diameter below 10 nm constituting less than 1% of the total pore volume, a preferential mesopore distribution over pores with a size in the range 10 to 50 nm, with a major portion of the pores included in pores with a diameter in the range 20 to 50 nm (36%) and a high median mesopore diameter (16, 21.3 and 22.5 nm).

Example 2 (Comparative)

Two alumina gels were synthesized following the same protocol as that described in Example 1, but varying the state of advance of the first precipitation step in a manner which was not in accordance with the invention: 0.20% to 35%.

Thus, only the quantity of alumina supplied during the first precipitation step was varied. Steps d), e) and f) were identical to those described in Example 1.

In the case in which the state of advance of the first precipitation step was 0%, no precursors containing aluminium were supplied to the first step.

The precipitation was carried out in a 5 L reactor at a temperature of 70° C. and a pH of 10.2.

The concentrations of aluminium precursors used were as follows: $Al_2(SO_4)$=102 g/L in $Al_2O_3$, and $NaAlOO$, 155 g/L in $Al_2O_3$. Addition of the reactants (basic aluminium salt, [AlOONa] and acid aluminium salt $[Al_2(SO_4)_3]$) was carried out continuously for 30 min, adjusting the pH to 9.0. All of the precursors were brought into contact at a temperature of 70° C. The targeted final alumina concentration was 45 g/L. The quantity of water initially present in the reactor was 2000 mL. The flow rate of aluminium sulphate had to be 20.6 mL/min, the sodium aluminate flow rate was 25 mL/min and the water flow rate was 21 mL/min. The weight ratio of sodium aluminate to aluminium sulphate was thus 1.84.

The suspension obtained was then filtered by displacement of water over a Buchner type frit apparatus and the alumina gel obtained was washed 3 times with 5 L of distilled water.

A cohesive paste was not obtained. Thus, it could not be shaped into extrudates.

In the case in which the state of advance of the first precipitation step was 20%, then the alumina was prepared as follows:

If a 5 L reactor is used and 4 L of alumina suspension with a final $Al_2O_3$ concentration of 45 g/L is envisaged, with a target state of advance of 20% for the first precipitation step, 20% of the total alumina has to be supplied during precipitation step a). The pH for the precipitation of the first step is fixed at 9.5 and the pH for the precipitation of the second step is at 9.0. The quantity of water initially present in the reactor is 1330 mL.

For the first precipitation step a) operating at 30° C. for 8 minutes, the flow rate of the aluminium sulphate has to be 15.2 mL/min, the sodium aluminate flow rate is 19 mL/min and the water flow rate is 49.2 mL/min. Thus, the weight ratio of sodium aluminate to aluminium sulphate is 1.91.

For the second precipitation step operating at 70° C. for 30 minutes, the aluminium sulphate flow rate has to be 16.5 mL/min, the sodium aluminate flow rate is 20 mL/min and the water flow rate is 30.1 mL/min. Thus, the weight ratio of sodium aluminate to aluminium sulphate is 1.84.

Shaping the Green Material:

The dried alumina gel was introduced into a Brabender type mixer. Water acidified with nitric acid to a total concentration of acid of 3%, expressed by weight with respect to the mass of dry gel introduced into the mixer, was added over 10 minutes, while mixing at 20 rpm. The acid mixing was continued for 5 minutes. A neutralization step was then carried out by adding an ammoniacal solution to the mixer, with a percentage neutralization of 200%, expressed as the weight of ammonia with respect to the quantity of nitric acid introduced into the mixer for the acidification step. Mixing was continued for 3 minutes.

The paste obtained was then extruded through a 2 mm three-lobed die.

g) Heat treatment: the extrudates obtained were dried at 100° C. overnight, then calcined for 2 h at 800° C. in a stream of moist air in a tube furnace (HSV=1 L/h/g with 30% v/v water).

The pore distribution of the alumina obtained was characterized by mercury intrusion porosimetry using the standard ASTM D 4284-83 at a maximum pressure of 4000 bar, using a surface tension of 484 dyne/cm and a contact angle of 140°.

The absence of microporosity was verified by nitrogen porosimetry.

In the case in which the state of advance for the precipitation step was 35%, the alumina was prepared as follows:

If a 5 L reactor is used and 4 L of alumina suspension with a final $Al_2O_3$ concentration of 45 g/L is envisaged, with a target state of advance of 35% for the first precipitation step, 35% of the total alumina has to be supplied during precipitation step a). The pH for the precipitation of the first step is fixed at 9.5 and second is 9.0. The quantity of water added to the reactor is 1330 mL.

For the first precipitation step a) operating at 30° C. for 8 minutes, the flow rate of the aluminium sulphate has to be 22.7 mL/min, the sodium aluminate flow rate is 28.5 mL/min and the water flow rate is 32.2 mL/min. Thus, the weight ratio of sodium aluminate to aluminium sulphate is 1.91.

For the second precipitation step operating at 70° C. for 30 minutes, the aluminium sulphate flow rate has to be 14.4 mL/min, the sodium aluminate flow rate has to be 17.5 mL/min and the water flow rate is 34.7 mL/min. Thus, the weight ratio of sodium aluminate to aluminium sulphate is 1.84.

Shaping the Green Material:

The dried alumina gel was introduced into a Brabender type mixer. Water acidified with nitric acid to a total concentration of acid of 3%, expressed by weight with respect to the mass of dry gel introduced into the mixer, was added over 10 minutes, while mixing at 20 rpm. The acid mixing was continued for 5 minutes. A neutralization step was then carried out by adding an ammoniacal solution to the mixer, with a percentage neutralization of 200%, expressed by weight of ammonia with respect to the quantity of nitric acid introduced into the mixer for the acidification step. Mixing was continued for 3 minutes.

The paste obtained was then extruded through a 2 mm three-lobed die.

Heat treatment: the extrudates obtained were dried at 100° C. overnight, then calcined for 2 h at 800° C. in a stream of moist air in a tube furnace (HSV=1 L/h/g with 30% v/v water).

The pore distribution of the alumina obtained was characterized by mercury intrusion porosimetry using the standard ASTM D 4284-83 at a maximum pressure of 4000 bar using a surface tension of 484 dyne/cm and a contact angle of 140°.

The absence of microporosity was verified by nitrogen porosimetry.

TABLE 2

Textural characteristics of aluminas of Example 2

|  |  | D | E | F |
|---|---|---|---|---|
| State of advance of first precipitation step |  | 0% | 20% | 35% |
| Heat treatment of extrudates |  | — | 800° C., 30% water v/v | 800° C., 30% water v/v |
| Mesoporosity | $V_{meso}$ (mL/g) | — | 0.73 | 0.62 |
|  | $D_p$ (nm) | — | 14.3 | 13.7 |
| Microporosity | $S_{microporous}$ (m²/g) | — | 1 | 0 |
| Macroporosity | $V_{macro}$ (mL/g) | — | 0.01 | 0.01 |
| BET surface area | (m²/g) | — | 204 | 178 |
| Pore distribution | V d < 10 nm (mL/g) | — | 0.15 | 0.17 |
|  | V d 10-20 nm (mL/g) | — | 0.45 | 0.43 |
|  | V d 20-50 nm (mL/g) | — | 0.20 | 0.18 |
|  | V d 50-7000 nm (mL/g) | — | 0.01 | 0.01 |
|  | V d > 7000 nm (mL/g) | — | 0.05 | 0.05 |

This example shows that it is not possible to obtain an alumina with the envisaged pore properties in a single precipitation step (state of advance of first step=0, alumina D).

In contrast, it is possible to obtain an alumina with a high mesopore volume, a high specific surface area, and a limited volume of macropores with a process with two precipitation steps. However, aluminas E and F obtained have a high proportion of pores with a size of less than 10 nm, and respective median mesopore diameters of 14.3 and 13.7 nm, which are therefore not in accordance with the invention. As a consequence, the aluminas E and F obtained have a state of advance for the first step which is not in accordance with the invention and thus do not have a preferential monomodal mesopore distribution for pores with a size in the range 10 to 50 nm, with a high median mesopore diameter of 16 nm or more.

The invention claimed is:

1. A process for preparing an amorphous mesoporous alumina, said process comprising at least the following steps:

a) a first step for precipitating, in an aqueous reaction medium to form a suspension, at least one basic precursor selected from the group consisting of sodium aluminate, potassium aluminate, ammonia, sodium hydroxide and potassium hydroxide and at least one acidic precursor selected from the group consisting of aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range of 8.5 to 10.5 and the flow rate of the acidic and basic precursor or precursors containing aluminium being adjusted in order to obtain a state of advance for the first step in the range of 5% to 13%, the state of advance being defined as the proportion of alumina formed, in $Al_2O_3$ equivalents, during said first step for precipitating with respect to the total quantity of alumina formed at the end of step c) of the process, said first step being operated at a temperature in the range of 20° C. to 90° C. and for a period in the range of 2 minutes to 30 minutes;

b) a step for heating the suspension to a temperature in the range of 40° C. to 90° C. for a period in the range of 7 minutes to 45 minutes;

c) a second step for precipitating the suspension obtained at the end of the heating step b), to obtain a second suspension, by adding to the suspension obtained at the end of the heating step b), at least one basic precursor selected from the group consisting of sodium aluminate, potassium aluminate, ammonia, sodium hydroxide and potassium hydroxide and at least one acidic precursor selected from the group consisting of aluminium sulphate, aluminium chloride, aluminium nitrate, sulphuric acid, hydrochloric acid and nitric acid, in which at least one of the basic or acidic precursors comprises aluminium, the relative flow rate of the acidic and basic precursors being selected so as to obtain a pH of the reaction medium in the range of 8.5 to 10.5 and the flow rate of the acidic and basic precursors containing aluminium being adjusted in order to obtain a state of advance for the second step in the range of 87% to 95%, the state of advance being defined as the proportion of alumina formed, in $Al_2O_3$ equivalents, during said second step for precipitating with respect to the total quantity of alumina formed at the end of step c) of the process, said second step being operated at a temperature in the range of 40° C. to 90° C. and for a period in the range of 2 minutes to 50 minutes;

d) a step for filtering the second suspension obtained at the end of the second precipitation step c) to obtain an alumina gel;

e) a step for drying said alumina gel to obtain a powder;

f) a step for shaping the powder to obtain a green material; and g) a step for heat treating the green material at a temperature in the range of 500° C. to 1000° C., in the presence of a stream of air containing up to 60% by volume of water.

2. The process according to claim 1, in which the state of advance in step a) is in the range of 6% to 12%.

3. The process according to claim 1, in which the state of advance in step a) is in the range of 7% to 11%.

4. The process according to claim 1, in which the basic precursor in one or both of steps a) and c) is sodium aluminate.

5. The process according to claim 1, in which the acidic precursor in one or both of steps a) and c) is aluminium sulphate.

6. The process according to claim 1, in which in the first step for precipitating, the aqueous reaction medium is water and said first step is operated with stirring, in the absence of an organic additive.

7. The process according to claim 1, in which the basic precursor in both of steps a) and c) is sodium aluminate.

8. The process according to claim 1, in which the acidic precursor in both of steps a) and c) is aluminium sulphate.

9. The process according to claim 1, in which the basic precursor in both of steps a) and c) is sodium aluminate and the acidic precursor in both of steps a) and c) is aluminium sulphate.

10. An amorphous mesoporous alumina having a median mesopore diameter, by volume determined by mercury intrusion porosimetry, of 16 nm or more, a mesopore volume, as measured by mercury intrusion porosimetry, between 0.70 mL/g and 0.90 mL/g, and a total pore volume, measured by mercury porosimetry, of more than 0.75 mL/g, wherein the volume of macropores in the mesoporous alumina is less than 10% of the total pore volume.

11. The amorphous mesoporous alumina according to claim 10, in which the volume of macropores in the mesoporous alumina is less than 5% of the total pore volume.

12. The amorphous mesoporous alumina according to claim 10, having no micropores.

13. The amorphous mesoporous alumina according to claim 10, having a median mesopore diameter, by volume determined by mercury intrusion porosimetry, of more than 18 nm.

14. The amorphous mesoporous alumina according to claim 13, having a median mesopore diameter, by volume determined by mercury intrusion porosimetry, of more than 20 nm.

* * * * *